United States Patent
Darrell et al.

(10) Patent No.: US 6,343,150 B1
(45) Date of Patent: Jan. 29, 2002

(54) DETECTION OF IMAGE CORRESPONDENCE USING RADIAL CUMULATIVE SIMILARITY

(75) Inventors: Trevor Darrell, San Francisco; Michele M. Covell, Palo Alto, both of CA (US)

(73) Assignee: Interval Research Corporation, Palo Alto, CA (US)

( * ) Notice: Subject to any disclaimer, the term of this patent is extended or adjusted under 35 U.S.C. 154(b) by 0 days.

(21) Appl. No.: 09/199,799

(22) Filed: Nov. 25, 1998

Related U.S. Application Data (60) Provisional application No. 60/066,521, filed on Nov. 25, 1997.

(51) Int. Cl.[7] .............................. G06K 9/00; G06K 9/46; G06K 9/68
(52) U.S. Cl. .................... 382/218; 382/115; 382/124; 382/125; 382/209; 382/219; 382/278
(58) Field of Search ...................... 382/115, 124, 382/125, 215, 218, 219, 276, 278, 280, 281, 288, 181, 195, 201, 209

(56) References Cited

U.S. PATENT DOCUMENTS

| | | | |
|---|---|---|---|
| 4,789,933 A | 12/1988 | Chen et al. | 382/128 |
| 5,422,986 A | 6/1995 | Neely | 345/426 |
| 5,521,633 A | * 5/1996 | Nakajima et al. | 348/118 |
| 5,999,651 A | * 12/1999 | Chang et al. | 382/215 |
| 6,049,621 A | * 4/2000 | Jain et al. | 382/125 |

OTHER PUBLICATIONS

Amini, et al. "Using Dynamic Programming for Minimizing the Energy of Active Contours in the Presence of Hard Constraints", IEEE, pp. 95–99, 1988.*

Boykov, Yuri, "Disparity Component Matching for Visual Correspondence", Carnegie–Mellon University and Cornell University, 1997, pps. 470–475.

Dolan, John et al, "Simple Region Growing", IUE Task Library, Jan. 1997, 2 pages.

(List continued on next page.)

*Primary Examiner*—Leo Boudreau
*Assistant Examiner*—Daniel G. Mariam
(74) *Attorney, Agent, or Firm*—Burns, Doane, Swecker & Mathis, L.L.P.

(57) ABSTRACT

A given point of interest in an image is defined by two properties, a local attribute, such as color, and a neighborhood function that describes a similarity pattern. The color value is not influenced by nearby background regions of the image, and functions as a descriptor for each location. The neighborhood function distinguishes locations of similar color from one another, by capturing patterns of change in the local color. The neighborhood function measures the similarity between the local color and colors at nearby points, and reduces the measured similarity values that lie beyond contrast boundaries. Through the computation of such a transform for points of interest in an image, corresponding points in other images can be readily identified.

16 Claims, 3 Drawing Sheets

OTHER PUBLICATIONS

Fujimura, Kouta et al, "Motion Analysis of Nonrigid Objects By Active Contour Models Using Multiscale Images", Systems and Computers in Japan, vol. 25, No. 2, 1994, pps. 81–91.

Gunn, Steve R. et al, "A Robust Snake Implementation; A Dual Active Contour", IEEE Transactions on Pattern Analysis and Machine Intelligence, vol. 19, No. 1, Jan. 1997, pps. 63–68.

Tsai, C.T. et al, "Minimising the Energy of Active Contour Model Using a Hopfield Network", IEE Proceedings–E, vol. 140, No. 6, Nov. 1993, pps. 297–303.

Bhat, Dinkar N. et al, "Ordinal Measures for Visual Correspondence", IEEE Computer Society Conference on Computer Vision and Pattern Recognition, Jun. 18–20, 1996, San Francisco, California, pps. 351–357.

Black, Michael J. et al, "A Framework for the Robust Estimation of Optical Flow", Proc. Fourth Int. Conf. on Computer Vision (ICCV '93), Berlin, Germany, May 1993, pps. 1–6.

Zabih, Ramin et al, "Non–parametric Local Transforms for Computing Visual Correspondence"; 8 pps.

* cited by examiner

DETECTION OF IMAGE CORRESPONDENCE USING RADIAL CUMULATIVE SIMILARITY

CROSS-REFERENCE TO RELATED APPLICATION

This disclosure is based upon, and claims priority from, Provisional U.S. Patent Application No. 60/066,521, filed Nov. 25, 1997, the disclosure of which is incorporated herein by reference.

FIELD OF THE INVENTION

The present invention is directed to the automatic detection of areas of correspondence in two or more images, and more particularly to a robust technique for detecting correspondence of points which lie on occluding boundaries.

BACKGROUND OF THE INVENTION

In the field of computer vision, there exist a variety of situations in which it is desirable to be able to automatically identify corresponding points in multiple images. Examples of these situations include (1) object tracking, in which the location of a given object is identified over a sequence of images, (2) image morphing, in which corresponding feature points must be identified on two images, to define the beginning and ending constraints for the morph, (3) rotoscoping, in which the outline of an object is determined over a sequence of images, so that the object can be selectively segregated from the remainder of the scene, and (4) estimation of camera motion, for special effects and the like. Initially, the identification of corresponding points, or features, in related images was done manually. It can be appreciated that the need to manually annotate each of a series of images can be quite time consuming, and therefore does not facilitate the implementation of any of the foregoing techniques in lengthy video sequences, or other such situations involving more than a few related images.

To this end, therefore, automatic techniques for locating corresponding points in different images have been developed. Many of the earlier techniques are based on the assumption that the brightness of the relevant features in the image remain constant over the various images. Techniques that are based upon this assumption perform best when tracking high-contrast regions that lie on a single surface. However, many images have visually important features that do not follow this assumption. For instance, if one desires to track complicated objects with multiple articulated surfaces, such as the human body, a technique is required which is capable of identifying corresponding points that lie on occluding boundaries, e.g., the apparent interface of features which are at different depths from the viewer.

Recently, robust estimation methods have been applied to the image correspondence problem, and have been shown to provide improved performance in cases where the points to be identified include occlusion. For instance, a robust optic flow method using redescending error norms that substantially discount the effect of outliers was described by M. Black and P. Anandan in "A Framework for Robust Estimation of Optical Flow," $4^{th}$ Proc. ICCV, pp. 263–274, 1993. Methods for transparent local flow estimation are described in Shizawa et al, "Simultaneous Multiple Optical Flow Estimation," Proc. CVPR, 1990. The use of rank statistics for robust correspondence is disclosed by D. Bhar and S. Nayar in "Ordinal Measures for Visual Correspondence," Proc. CVPR, pp. 351–357, 1994. Another technique using ordering statistics, combined with spatial structure in the CENSUS transform, is described in R. Zabih and J. Woodfill, "Non-parametric Local Transforms for Computing Visual Correspondence," Proc. $3^{rd}$ ECCV, pp. 151–158, 1994. Yet another approach uses methods of finding image "layers" to pool motion information over arbitrarily shaped regions of support and to iteratively refine parameter estimates. Examples of this approach are described in T. Darrell, and A. Pentland, "Robust Estimation of a Multi-Layer Motion Representation," Proc. IEEE Workshop on Visual Motion, Princeton, N.J., 1991; J. Wang and E. H. Adelson, "Layered Representations for Image Sequence Coding," Proc. CVPR, 1993; and S. Ayer and H. Sawhney, "Layered Representation of Motion Video Using Robust Maximum Likelihood Estimation of Mixture Models and MDL Encoding," Proc. ICCV, 1995. These latter approaches rely upon models of global object motion to define coherence.

Figure 1A:
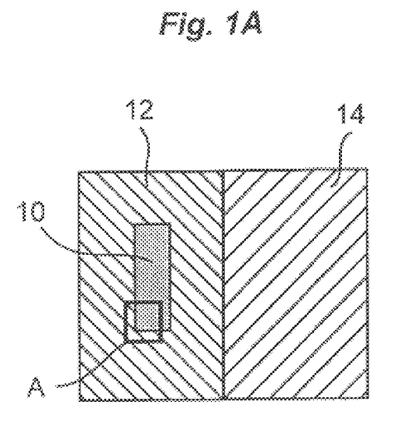
FIGS. 1A and 1B are illustrations of a contrast sign change at an occlusion boundary.
Figure 1B:
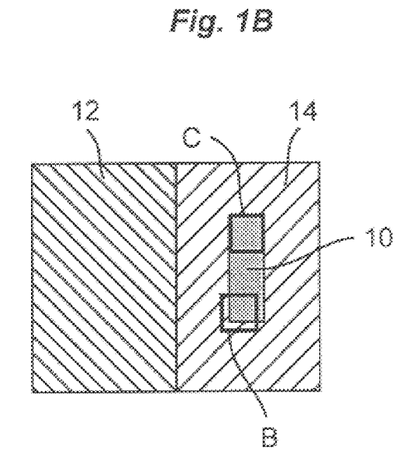

While the foregoing techniques provide varying degrees of acceptable performance in the case of tracking occluding features, they all rely upon the assumption that there exists sufficient contrast in the foreground object to localize a correspondence match. In many cases, however, this assumption does not apply, for instance due to uniform foreground surfaces or low-resolution video sampling. An example of this problem is illustrated in FIGS. 1A and 1B. In these examples, a foreground object 10 having no internal contrast moves from a relatively dark background 12 (FIG. 1A) to an area that provides a relatively light background 14 (FIG. 1B). This example may correspond to the situation in which a uniformly colored object, such as a human finger, moves in front of differently colored background objects. As a result of this movement, the contrast at the occlusion boundary, i.e., the edge of the object 10, changes sign between the two images. An analysis window is indicated by the reference A in FIG. 1A. When attempting to identify a corresponding area in FIG. 1B, the prior art techniques described above are as likely to equate either of the areas B or C to the area A, due to the lack of internal contrast within the object.

Many of the foregoing correspondence methods are not able to adequately deal with the situation in which there is no coherent foreground contrast. In these types of situations, attempts at using transparent-motion analysis, to detect the motion of the object, have been employed. However, these techniques have not been able to provide precise spatial localization of corresponding points. In some cases, smoothing methods such as regularization or parametric motion constraints can provide approximate localization when good estimates are available in nearby image regions, but do not provide consistent results across a variety of situations.

Many detailed image analysis/synthesis tasks require that precise correspondence be found between images. For instance, image compositing, automatic morphing and video resynthesis require accurate correspondence, and slight flaws can yield perceptually significant errors. To minimize the effect of such errors, practitioners of the foregoing prior art techniques have relied upon extreme redundancy of measurement, human-assisted tracking, substantial smoothing, and/or domain-specific feature-appearance models. However, each of these approaches further complicates the process, thereby increasing the time and effort that is required. Even then, they cannot guarantee acceptable results.

It is an objective of the present invention, therefore, to provide a technique for automatically identifying corresponding points in two or more images that is capable of providing good performance near occluding boundaries, particularly when foreground objects contain little or no contrast, and to do so without the need for prior training, smoothing, or pooling of motion estimates.

SUMMARY OF THE INVENTION

In accordance with the present invention, the foregoing objective is achieved by defining an image transform, which characterizes the local structure of an image in a manner that is insensitive to points from a different surface, but which recognizes the shape of the occlusion boundary itself. In general, matching is performed on a redundant, local representation of image homogeneity.

In accordance with the invention, a given point of interest in an image is defined by two properties, a local attribute and a neighborhood function that describes a similarity pattern. In one embodiment of the invention, the local attribute can be the color of a pixel, or an area of pixels. Since the color value is not influenced by nearby background regions of the image, it can function in certain cases as a reliable descriptor for each location. The neighborhood function distinguishes locations of similar color from one another, by capturing patterns of change in the local color. The neighborhood function highlights occlusion boundaries, while removing the effects of background pixels. In essence, it measures the similarity between the central local color and colors at nearby points, and reduces the measured similarity values that lie beyond contrast boundaries. This approach reduces the influence of background pixels, since an intervening occlusion boundary is typically characterized by a contrast boundary as well. The remapping of similarity values creates a rapid transition from high to low similarity, which further serves to highlight the occlusion boundaries.

Through the computation of such a transform for points of interest in an image, corresponding points in other images can be readily identified. The results provided by the invention are particularly useful in techniques for tracking object contours, for applications such as rotoscoping. Specific features of the invention are described hereinafter with reference to the illustrative examples depicted in the accompanying drawings.

DETAILED DESCRIPTION

Figure 2A:
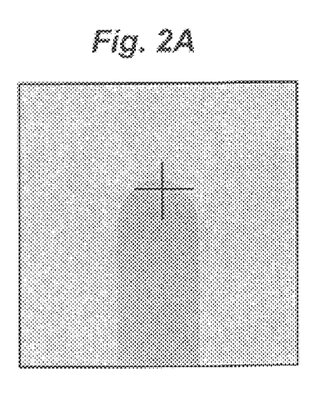
FIGS. 2A–2C are related images which illustrate an example of movement of a uniform colored object over different backgrounds.
Figure 2B:
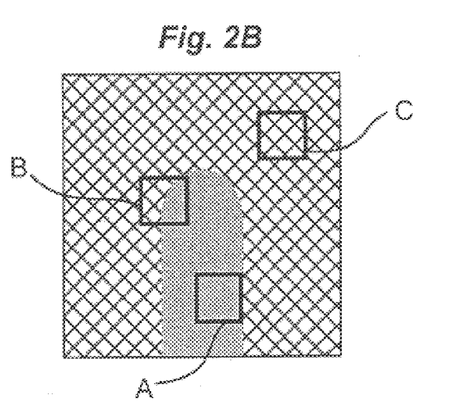
Figure 2C:
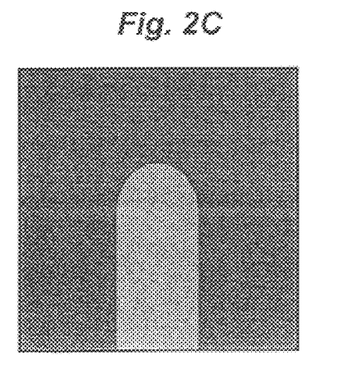

Generally speaking, the present invention functions to identify a point in an image, e.g. a pixel, which corresponds to a designated point in another, related image. A representative example of the type of problem to be solved by the present invention is illustrated in FIGS. 2A–2C. These three figures represent a sequence of images in which an object, such as a human finger, moves across three different areas that respectively constitute a uniform light background, a highly textured background, and a uniform dark background. The point of interest in this case is the tip of the finger, as designated by cross hairs in FIG. 2A. This point can be manually labeled by a user, or automatically identified by known techniques for recognizing specific features. Once the point has been designated in one of the images, the basic objective is to locate the corresponding point in each of the other two images. This analysis can be repeated for each point in the first image, if the desired result is a dense map of pixel correspondence.

In accordance with the present invention, the identification of the corresponding point is carried out by examining each pixel of the subsequent images and determining a characteristic transform for that pixel. This characteristic information is compared against characteristic information for the point of interest in the original image, to determine their degree of correspondence.

The concepts which embody the present invention are preferably carried out in a suitably programmed computer in which images to be processed are digitized and stored. Since the structure of the computer, as well as the techniques for storing and measuring the parametric content of the pixels of an image, are well-known, a description of those concepts are omitted herein. The following discussion is directed to those features of the invention which depart from the known prior art.

Since contrast determines the ability to find unique correspondences between images, the technique of the present invention considers the sources of contrast within a local image window which may contain an optional occlusion boundary. A window can be defined for each pixel to be examined. Examples of local image windows are illustrated in FIG. 2B. In general, it is not known a priori whether contrast within a particular window is entirely within the foreground region, in the case of window A, is due to the occlusion boundary between foreground and background, as in window B, or is entirely within a background region, as in window C. When contrast occurs in the foreground region, it is preferable to model the contrast fully, both in magnitude and sign. When the contrast is due to an occlusion edge, only the contrast energy is relevant, since the sign of the contrast is arbitrary with changing background. When the contrast is entirely in the background region, it should be ignored.

In accordance with the present invention, a local image representation achieves each of these objectives, without any prior knowledge of the location of the occlusion. Generally speaking, the representation consists of a central image-attribute value, and a local contrast neighborhood of this attribute, which has been attenuated to discount background influence. To facilitate an understanding of the invention, the embodiments which are discussed hereinafter utilize color as the image attribute whose value is analyzed to determine the representation. It is to be noted, however, that any other parametric characteristic of an image can be employed as the attribute to be analyzed. For example, properties such as texture or range data can be employed.

Basically speaking, for a given discrete image attribute intensity function I(x,y), the present invention computes a local robust representation defined as:

$$R_I(x,y) = \{C_I(x,y), N_I(x,y,r,\theta)\} \quad (1)$$

This representation consists of two terms, a central value C and a neighborhood function N. The central value comprises the image attribute at a center point at position (x, y), or averaged over a small central area, as follows:

$$C_I(x, y) = \frac{1}{2(M_c + 1)^2} \sum_{i,j=-M_c}^{i,j \leq M_c} A(I, x + i, y + j - i) \quad (2)$$

where A(I, x, y) is an image attribute function which can be any local image property whose values are normalized to be between 0 and 1. In the presently described examples, the image attribute function is the color or hue vector that corresponds to the pixel at the given location. It is desirable to keep the central region small, with $M_c=0$ or 1.

Figure 3A:
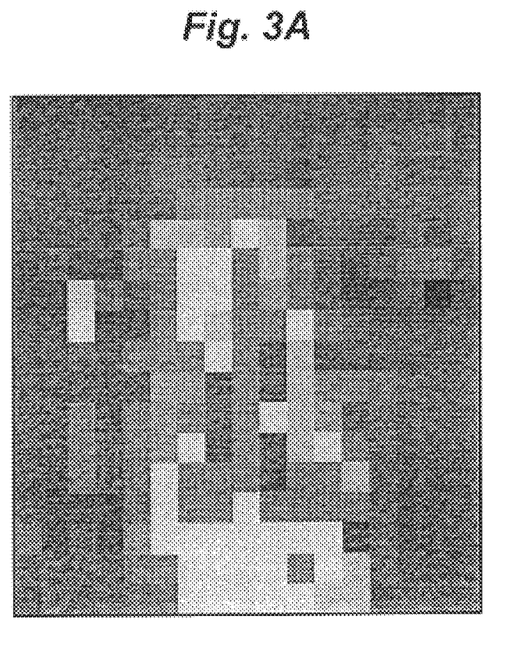
FIGS. 3A and 3B respectively illustrate one example of a map of local dissimilarity and a neighborhood of cumulative similarity.

The second factor in the representation, the neighborhood function, determines the similarity of other image attribute values to the central value. For a given two-dimensional image I, the term $I_{x0,y0}(r, \theta)$ is defined as the image attribute value that is r units away from the point (x0, y0), in the direction $\theta$. The neighborhood function, $N_I(x,y,r,\theta)$, is defined by means of point dissimilarities. The point dissimilarity function measures the difference between the local color $C_I(x,y)$ and the image values, $I_{x,y}(r,\theta)$ as follows:

$$E_I(x,y,r,\theta) = \alpha^2 \|C_I(x,y) - I_{x,y}(r,\theta)\|^2 \quad (3)$$

where $\alpha$ represents a contrast sensitivity coefficient. It is significant to note that the point dissimilarity, $E_I(x,y,r,\theta)$, only depends upon the magnitude of the color change, and not on its direction. FIG. 3A illustrates an example of a map of local dissimilarity for a window which encompasses the end of a finger and its occluding boundary. The pixel at the center of the window defines the central color attribute. Lighter pixels in the window depict a small dissimilarity, and darker pixels indicate a greater dissimilarity from the central attribute.

The neighborhood function, $N_I(x,y,r,\theta)$, is computed from the point dissimilarities by propagating $E_I(x,y,r,\theta)$ radially over a window with coordinates $r \leq M_n$ and $0 \leq \theta \leq 2\pi$. When tracking a single feature of known size, it is possible to compute the point dissimilarity over a fixed window that is cropped to encompass the entire feature and the occlusion boundary. This approach yields a template which captures both the foreground and occlusion contrast, and is insensitive to contrast sign. However, when automatically tracking features for image analysis and synthesis, or when computing dense correspondence for stereo or motion, it is typically not possible to know the appropriate window size beforehand.

For fully automatic processing, therefore, it is preferable to employ a function which substantially attenuates the influence of background pixels. As the point dissimilarity is radially propagated, if a significant dissimilarity is encountered, namely contrast energy, the influence of any contrast farther along that radius is attenuated, on the assumption that background contrast lies beyond the occurrence of occlusion contrast. In accordance with the preferred embodiment of the invention, therefore, the neighborhood function is computed as follows:

$$N_I(x,y,r,\theta) = \exp\{-\int_{p<r} dp\, E_I(x,y,p,\theta)\} \quad (4)$$

Figure 3B:
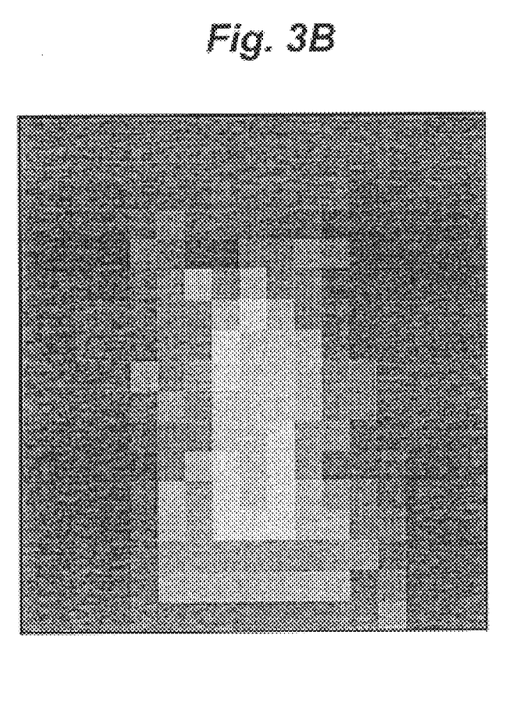

Once the neighborhood function encounters a large dissimilarity, it attenuates the influence of the similarity values farther along that radial direction, by reducing them towards zero. In particular, the point dissimilarity on the background side of an occluding boundary can be expected to be large, due to arbitrary changes from the foreground color. The cumulative integration and negative exponentiation decreases the influence of such large background fluctuations. Thus, the larger the intervening dissimilarity, the less the background pattern affects the representation. Consequently, correspondence judgments are made on the basis of the most proximate contrast. FIG. 3B illustrates a neighborhood of local similarity, $N_I$, for the example depicted in FIG. 3A.

By using the foregoing approach, the dimension of the analysis window, $M_n$, can be data driven. In essence, the propagation in a given radial direction continues until the dissimilarity value exceeds a predetermined threshold. Once this limit is reached, there is no need to examine data any further in that direction. In essence, therefore, the neighborhood function indicates which neighbor points belong to the foreground feature, i.e. its spatial extent.

The representation $R_I(x,y)$ that is formed by the central value and the neighborhood, or similarity, function is referred to herein as the Radial Cumulative Similarity (RCS) transform, since it reflects the radial homogeneity of a given attribute value. A significant benefit of this transform is its invariance to the sign of contrast at an occluding boundary, as well as its invariance to background contrast.

The RCS transforms for the various points in an image can be employed to determine their correspondence to a designated point in another image. To do so, a distance metric is calculated, using the RCS transform for each of two points. This distance metric is based upon the central attribute and neighborhood function value for the two points, denoted as (x,y) and (x', y'), as follows:

$$D_\lambda(R_I(x,y), R_{I'}(x',y')) = \lambda \Delta N + (1-\lambda) * \Delta C \quad (5)$$

where $\lambda$ represents the relative weighting of the central attribute and the neighborhood function value, $\Delta N$ designates the neighborhood difference and $\Delta C$ is the central attribute difference. The neighborhood difference is defined as:

$$\Delta N = \frac{1}{2\pi(M_n)^2} \sum_{r,\theta}^{r<M_n} (N_I(x, y, r, \theta) - N_{I'}(x', y', r, \theta))^2 \quad (6)$$

Similarly, the central attribute difference is defined as:

$$\Delta C = \frac{1}{a}(C_I(x, y) - C_{I'}(x', y'))^T (C_I(x, y) - C_{I'}(x', y')) \quad (7)$$

where a is the dimension of A.

The weighting term $\lambda$ represents a tradeoff between the contribution of the central attribute error and the neighborhood function error. For most cases, the neighborhood error is more important, since it captures the spatial structure at the point of interest. However, in situations where spatial ambiguity may exist, the central attribute value can provide a greater contribution in determining an unambiguous match. In cases of uncertainty, therefore, a lower value of $\lambda$ may be desirable.

If rotational invariance is desired when determining points of correspondence between two or more images, the neighborhood function can be normalized by pre-rotating it such that its dominant axes are in canonical configuration.

Given a point (x,y) in an image I, having an RCS transform $R^* = R_I(x,y)$, a search for the corresponding point $(\hat{x}, \hat{y})$, in a second image I' is carried out by determining an optimal displacement value $(\hat{u}, \hat{v})$. This optimal value is obtained by examining the distance metric at a plurality of displacements (u,v) over an interval $(-M_W, M_W)$, and selecting the displacement with the minimum measured value as the optimal displacement value. In a preferred embodiment of the invention, for each displacement, the distance metrics are summed over an interval $(-M_S, M_S)$, where $M_S$ defines the radius of a spatial smoothing window. This approach to the determination of the optimal displacement can be expressed as follows:

$$(\hat{u}, \hat{v}) = \arg\min_{uv} \sum_{i,j} N_I^*(x, y, i, j) D_\lambda(R_I(x+i, y+j), \quad (8)$$

$$R_{I'}(x+i+u, y+j+v))$$

$N^*_I(x,y,i,j)$ is the neighborhood function defined over Euclidian coordinates, as follows:

$$N_I^*(x,y,i,j) = N_I(x,y,r_{ij},\theta_{ij}) \quad (9)$$

where $r_{ij}$ is the radius to a point i,j, and
$\theta_{ij}$ is the angle to the point i,j.
The corresponding point $(\hat{x},\hat{y})$ in the second image is then determined by adding the optimal displacement value to the original location, i.e., $\hat{x}=x+\hat{u}$ and $\hat{y}=y+\hat{v}$.

The function of the summation in Equation 8 is to smooth the disparity result in a non-isotropic manner, before computing the minima. This is done by summing the disparity over neighboring points, which are weighted by the neighborhood function for the point of interest. This smoothing reduces errors that are caused by noise and ambiguous image data. By using the neighborhood function to weight the smoothing operation, the smoothing is limited to foreground areas in the image. In other words, the neighborhood function defines a mask that delineates the foreground object, and limits the smoothing operation to the spatial extent of that object. Unlike prior art approaches, therefore, the smoothing does not introduce a large border of incorrect results that are due to the averaging of two different sources, namely the background object and the foreground object, when a window of reasonable size is employed. In an exemplary embodiment, the smoothing window can have a radius $M_S$ in the range of 3–5. By setting $M_S$ to a value of zero, no smoothing is performed.

In addition to identifying the correspondence between points in two or more images, the RCS transform also provides information that can be used to improve the performance of known techniques for tracking the outline of an object. The ability to track the outline of an object is an important tool in applications such as rotoscoping, where the image of the object is to be segregated from the remaining portion of a larger image. One approach that has been used for this purpose is an active contour model known as "snakes", and is described in detail by Kass et al, "Snakes: Active Contour Models", Proc. ICCV, pp. 259–268, London, 1987. Briefly, snakes function to track contours by minimizing the sum of external forces, from a local image measure, and internal forces, from a shape-dynamics model. A snake tracks an indicated contour by finding the minimum of the combined external and internal forces. The external force acts upon the snake according to the current appearance of the image. The internal force provides spatial and temporal continuity to the tracked contour.

Object tracking approaches that are based upon snakes generally employ a simple contrast measure to define the external forces on the model. This approach works well in situations where the contour being tracked is not an occluding boundary, or when the background is simple and free of clutter. However, in applications such as rotoscoping, the occluding boundary is the very contour that must be tracked, and the background may be arbitrary. In this situation, the snake often confuses the background texture for the desired contour. To improve performance, therefore, it has been necessary to define detailed shape and motion models for each object that is to be tracked. However, since the Radial Cumulative Similarity transform provides information that is insensitive to changes in background contrast, it can be employed as an alternative to the simple contrast measures that were conventionally used.

Figure 4A:
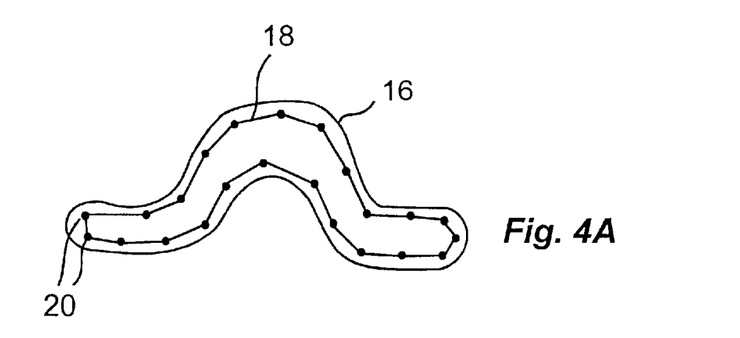
FIGS. 4A–4C illustrate a sequence of images in which an object is tracked by using the snakes technique.
Figure 4B:
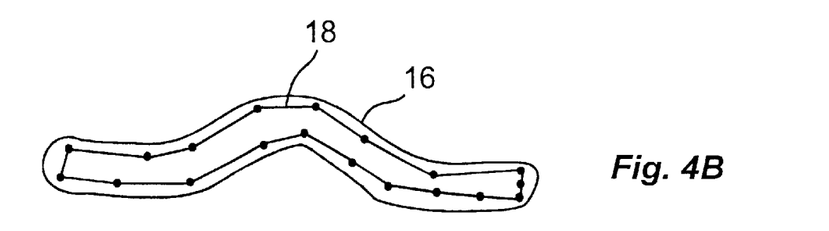
Figure 4C:
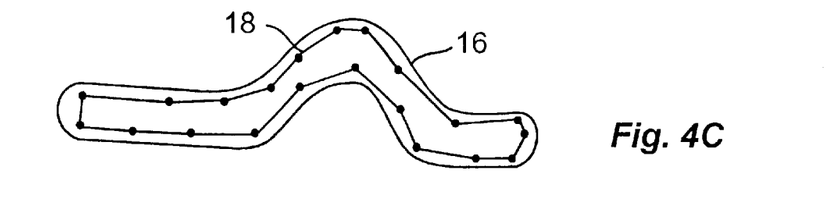

In general, in the use of snakes to track an object, the user initially draws a contour related to the shape of the object to be tracked. FIG. 4A illustrates the outline of an object 16 that is to be tracked, such as an inchworm. Within the silhouette of the object, the user has drawn a contour 18, which is defined by a series of nodal points 20. In operation, the snakes technique functions to identify the location of these nodal points in subsequent images, so that the object can be tracked. For instance, if a video sequence depicts the inchworm moving across a surface, as in FIGS. 4B and 4C, the snakes technique functions to indicate the position and configuration of the inchworm in the successive images of the video sequence. In particular, as the inchworm changes shape to provide its locomotion, the snakes technique redefines the contour to correspond to the change in shape.

The RCS transform can be employed within the context of the snakes technique in either a simple, or sparse, instantiation, to provide a coarse tracking of the object, or in a dense instantiation to provide a finer degree of tracking. In the sparse implementation, the approach is similar to matching isolated points in two images, according to the technique described previously. As a first step, an RCS transform value is assigned to the initial nodal points of the user-drawn contour. The external force for determining the snake in subsequent frames is computed from the net metric distance between the desired RCS value and the actual RCS value of a proposed node location, in accordance with equation 5.

One of the advantages of this particular approach is that it is quite fast, since only sparse RCS transform samples are required, namely those at the proposed nodal points. The speed also results from the fact that the external force at each node is independent of the locations of the other nodes. The internal-energy term that is employed in the snake helps to disambiguate alternative matches of the RCS transform.

The speed that is achieved with this approach, however, may require a tradeoff with respect to certain factors. The coordinates for the RCS transform are related to the image-plane coordinates, rather than rotating with the rotation of the snake. In addition, the sparseness of the RCS sample that is used to determine the external forces may not provide adequate resolution. For instance, if a nodal point happens to fall in an extremely low or extremely high contrast area, it could be subject to false minima. Within these constraints, however, the sparse implementation is well-suited for matching over a large area, such as those that are encountered when tracking a coarsely-sampled sequence or in matching to isolated images. This implementation will typically provide a good matching at a coarse level, which can then be refined using a dense implementation of the RCS transform within the snakes technique.

In the dense implementation, a ray from each of the RCS transforms is employed along the full contour defined by the snake. This approach provides rotational invariance, since the rays are oriented perpendicular to the snake contour at each point. Furthermore, since the external force term of the snake is determined by the RCS transform along the full contour length, ambiguities which might result from matching only nodal points can be avoided.

The dense implementation of the RCS transform is carried out by defining an RCS profile. The RCS profile consists of two components, a local-color line and a similarity profile. The local-color line is a local color sampled along a line segment from the point $(x_0, y_0)$ to the point $(x_1, y_1)$, and as defined as follows:

$$C_I(s|x_0,y_0,x_1,y_1) = C_I(x_s,y_s) \qquad (10)$$

where $x_s = x_0(1-s) + x_1 \, s$, and
$y_s = y_0(1-s) + y_1 \, s$.
The variable s indexes different locations along the line segment.

The similarity profile consists of samples from the RCS neighborhood functions. These patterns are sampled along the line segment, and the selected patterns are themselves sampled along the angle perpendicular to that line segment. The similarity profile is defined as follows:

$$N_I(s,r|x_0,y_0,x_1,y_1) = N_I(x_s,y_s,r,\theta_\perp) \qquad (11)$$

Each node of the snake has an associated RCS profile, which is taken along the line segments between the current node and its two neighbors. For subsequent frames, the external force is computed according to the distance metric between the desired RCS profile and the RCS profiles associated with proposed node locations.

The dense implementation of the RCS transform within snakes provides rotational invariance, since the axes of the similarity profiles are defined relative to the node locations. It also avoids errors that might result from local minima, since it employs matching along the full length of the snake, rather than at a few points. In addition, the external-energy term provided by the dense-RCS implementation accommodates stretching and shrinking of the contour length, since the sample density of the RCS profile is normalized by the length of the segment. This property is particularly useful for matching certain types of non-rigid deformations. For instance, if a snake is used to identify the edge of a person's lips, the snake will properly track the stretching that occurs along the edge of the lips as the person's mouth opens.

When the snake forms a closed contour and the user indicates which side of that closed contour is the foreground object, it is possible to further improve the tracking capability of the RCS profile by treating "interior rays" differently from the "exterior rays". It is desirable to have the user indicate which side is foreground, even when the contour is closed, since sometimes the tracking may be based on the rim of a deformable hole in the foreground object—such as the lips on a mouth that opens and closes—and other times the tracking is looking for the outer edge of an localized object—such as the outer boundary of the inchworm. "Interior" and "exterior" rays are the portions of the sampling lines (perpendicular to the snake's segments) that are on the opposite sides of the snake contour. The exterior rays are those segments of the sampling lines that are on the same side of the snake contour as the occluding boundary and the interior rays are on the opposite side. For the example of the inchworm, the interior rays would be those that are inside the snake contour, on the inner portions of the worm, and the exterior rays would be those that are outside the snake contour, partly on the worm and partly on the background regions. In the case of tracking lips of a moving mouth, the interior rays would be those segments that are outside the snake contour, on the face itself, and the exterior rays would be those that are inside of the snake contour, partly on the lips and partly on the teeth, tongue, and palate.

When the snake contour is closed and the interior and exterior directions have been identified, the RCS profile is used along the exterior rays and the unchanged image color values are used along the interior rays. This approach is preferable over the unmodified RCS profile, since it uses all the color information for tracking (both magnitude and sign) in those regions that are known to be part of the foreground object and it uses only the more occlusion-stable RCS description in those regions that are expected to contain occlusion boundaries.

When the dense implementation of the RCS transform in snakes is employed for tracking within sequences, the snake configuration from a previous frame can be used to estimate the position in the current frame. To avoid the accumulation of positioning errors, it is desirable to update the RCS profile. One approach that can be employed for such updating is described in "Tracking Non-Rigid Objects In Complex Scenes" by D. Huttenlocher et al, Proc. ICCV, pages 93–101, Berlin, 1993.

In a preferred embodiment, the sparse implementation of the RCS transform is first employed to provide a coarse match for a snake. Thereafter, the dense implementation is used to refine the initial match. By initially using the sparse implementation, the search area that is needed for the dense RCS version is reduced. Once the coarse match has been found, the dense RCS implementation improves the detailed alignment of the snake along the full length of the contour.

Figure 5:
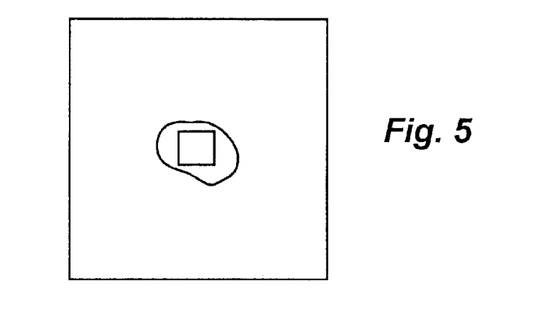
FIG. 5 illustrates an example of a snake drawn on an object of interest.

The use of the RCS transform within the snakes technique is particularly advantageous when applied to the semi-automatic rotoscoping of objects that are in the foreground of an image. In this procedure, the user draws a snake in the first frame of a sequence of interest. FIG. 5 illustrates an example in which the user has drawn a snake on an object of interest. Preferably, the snake should be located fairly close to the boundary of the object, but the full length of the snake should be completely inside the object's occluding contour. The snake is formed as a closed contour, in which the first and final nodes are logically connected to make them neighboring nodes.

The closed-contour snake is propagated through the sequence of interest, using the dense implementation of the RCS transform, or a combination of the dense and sparse implementations, as described above. The snake that is defined for each frame in the sequence can then be used to automatically rotoscope the object out of the scene.

Figure 6:
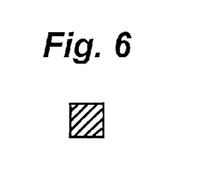
FIGS. 6A–6C illustrate the use of the RCS profile to obtain an object outline from the snake of FIG. 5, for rotoscoping purposes.
Figure 6B:
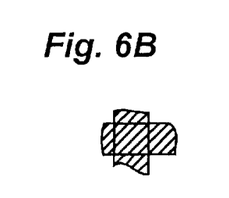
Figure 6C:
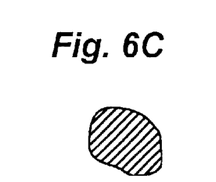

The rotoscoping is carried out by defining an alpha channel value for each frame. In essence, the alpha channel value defines the portion of a frame that is visible to the viewer. Initially, the alpha channel value for each frame is set to a value of one inside the snake contour and a value of zero outside, as depicted in FIG. 6A. The alpha channel values are then modified, according to a one-dimensional RCS profile. For each line segment of the snake, the alpha channel values are set to be the maximum of the current alpha channel value at that location and the similarity-profile value for that location. This step extends the edges of a selected region to the edge of the desired object, in a direction perpendicular to the line segments of the snake, as illustrated in FIG. 6B. This extension provides a continuous-valued roll-off at the edges of the object. It also allows the edges of the selected region to curve, according to the details of the object's shape, rather than being formed of straight line segments. As a final step, locations near the snake nodes are modified using the RCS neighborhood functions for the nodal points, to result in a selected region as shown in FIG. 6C. This last step fills in the sharp angles that otherwise occur at convex snake nodes. The result is a rotoscope mask which can be used to segregate the object from the remainder of the image.

From the foregoing, it can be seen that the present invention provides an image transform that describes local image homogeneity, based upon a central attribute value and the radial similarity of surrounding structure. The transform yields a representation that is insensitive to structure outside an occluding boundary, but which can model the boundary itself. The transform can therefore be used to track foreground surfaces near an occlusion, even in the absence of foreground contrast. Furthermore, when applied to snakes, it can be employed to track object outlines for automatic rotoscoping applications.

In addition to being an effective method for finding point correspondences near occluding boundaries, the RCS transform is also effective at locating correspondences in interior regions of objects when the local image contrast allows the computation of a neighborhood image which is reasonably unique and thus descriptive of the local properties of the foreground object. In certain cases this may not be possible, such as when there is no contrast in the image, or when there is very high contrast in all spatial directions. In the former case the neighborhood function is uniformly near 1; in the latter case the function is reduced to approximately a single non-zero point at the center of the function. In the former case, a contrast-based local correspondence process is not effective, but the color component of the RCS transform can provide some localization performance. In the latter case, many conventional techniques might perform well. The most classical of these use distance metrics based on the "Sum of Squared Difference" or the "Normalized Correlation" techniques. An example of such a technique is disclosed in Ballard and Brown, "Computer Vision," Prentice Hall, Englewood Cliffs, N.J., 1982.

It may therefore be preferable when performing the RCS transform to first carry out a classical correspondence computation, and if an unambiguous match is found, to use it as the correspondence result. This can be implemented in several ways; one preferred technique is to compute a conventional distance function over possible displacements u,v, as in Equation 8, and if the minimum distance using a conventional distance metric is below a predetermined threshold, to employ this value as the actual displacement. If the minimum distance based on conventional metric is above the threshold, the result given by Equation 8 is used. If smoothing of the distance results is to be performed, it is preferable to separately conduct whatever smoothing operation is appropriate for the conventional technique, and then perform smoothing on the RCS distance measurement if a decision is made to use the RCS result for a point.

The selection of the appropriate threshold can vary in dependence upon the results that are considered to be most desirable for any given application. In this regard, the decision to switch from a conventional technique to the RCS transform need not be an absolute switch based on a fixed threshold. Rather, it can be carried out on the basis of a softer, non-linear function.

It will be appreciated by those of ordinary skill in the art that the present invention can be embodied in other specific forms without departing from the spirit or essential characteristics thereof. The fundamental concept of the invention resides in a local image representation defined by the combination of two basic steps, namely the determination of a local similarity distance measure that is defined relative to a central value, and a filling operation which propagates a measure outwardly from the central area until a dissimilarity is encountered. While a particular approach has been described for the determination of the similarity, a variety of suitable distance metrics could be employed with success. Similarly, any of a number of known region growing operations can be employed to implement the filling step. In this regard, the growth need not take place radially; rather it can proceed in any manner that will provide the ability to detect the dissimilarity.

The presently disclosed embodiments are therefore considered in all respects to be illustrative, and not restrictive. The scope of the invention is indicated by the appended claims, rather than the foregoing description, and all changes that come within the meaning and range of equivalence thereof are intended to be embraced therein.

What is claimed is:

1. A method for determining the correspondence between points in two images, comprising the steps of:
    determining a representation for a point in a first image, comprising a central attribute value and a similarity function which identifies the similarity of points within a window containing said point in said first image to said central attribute value;
    selecting a point in a second image;
    determining a representation for said point in said second image; and
    comparing said representation for said point in said first image with said representation for said point in said second image.

2. The method of claim 1, wherein said central attribute value is the color for the point.

3. The method of claim 1, wherein said central attribute value is the average color over an area of the image which includes the point.

4. The method of claim 1 including the steps of selecting a plurality of points in said second image, determining a representation for each selected point and comparing each such representation to the representation for the point in the first image, and identifying the selected point in the second image whose representation differs the least from the representation for the point in the first image as a corresponding point.

5. The method of claim 4, wherein a representation is determined for each point in the first image, and compared with plural points in the second image, to produce a dense map of image correspondences.

6. The method of claim 4, comprising the steps of computing a representation for each of a plurality of points in the first image which are nodal points on a closed contour, and identifying corresponding nodal points in the second image to track the closed contour in the second image.

7. The method of claim 6 further including the steps of:
    determining the value of an attribute of the image at selected points on a line between two nodal points of the closed contour;
    for each such point, determining the similarity of said attribute value to the attribute value for other points in the image in a direction of propagation from said selected point that is perpendicular to said line; and
    combining the determined similarities for the selected points to produce a profile for the contour.

8. The method of claim 7, wherein the profile for the contour is compared to a profile for a contour defined by proposed node locations in said second image, to track the contour in the second image.

9. A method for generating a representation of a point in an image, comprising the steps of:
    determining the value of an attribute of the image at a selected point in the image;
    determining the similarity of said attribute value to the attribute value for other points in the image in radial directions of propagation from said selected point; and combining the determined similarities to produce a neighborhood function that indicates the radial homogeneity of the attribute value.

10. The method of claim 9, wherein said similarities are combined by computing the integral of the similarities in a direction of radial propagation.

11. A method for determining the correspondence between points in two images, comprising the steps of:

determining a characteristic value for each of a plurality of points in first and second images comparing the characteristic values for plural pairs of points, where each pair comprises a point in the first image and a point in the second image, to determine difference values; and anisotropically smoothing said difference values by combining difference values for different pairs of points, while limiting the pairs of points that are combined in accordance with a mask function for each point.

12. The method of claim 11, wherein said mask identifies the points that are associated with a foreground portion of an image.

13. The method of claim 12, wherein said mask is defined by the steps of:

determining the value of an attribute of an image at a selected point in the image;

determining the similarity of said attribute value to the attribute value for other points in the image in radial directions of propagation from said selected point; and combining the determined similarities to produce a neighborhood function that indicates the radial homogeneity of the attribute value.

14. The method of claim 12, wherein said mask is defined by the steps of:

determining the value of an attribute of an image at a selected point in the image;

measuring the difference between said attribute value and the attribute value for other points in the image;

propagating said measurement in different directions relative to said selected point until a dissimilarity is encountered in each such direction; and defining a region of local homogeneity relative to the selected point, based on the propagated measurements.

15. A method for determining correspondence between images, comprising the steps of:

computing a local image transform which indicates a structure of a foreground region within a window, for each of a plurality of image points, wherein the structure of the foreground region is computed by:

determining a value of an attribute of an image at a selected point in the image, measuring a difference between said attribute value and an attribute value for other points in the image, propagating said measurement in different directions relative to said selected point until a dissimilarity is encountered in each such direction, and defining a region of local homogeneity relative to the selected point, based on the propagated measurements; and comparing the transforms for pairs of points to determine their correspondence.

16. A method for determining correspondence between images, comprising the steps of:

computing a local image transform which indicates a structure of a foreground region within a window, for each of a plurality of image points, wherein the structure of the foreground region is computed by:

determining a value of an attribute of an image at a selected point in the image, determining a similarity of said attribute value to an attribute value for other points in the image in radial directions of propagation from said selected point, and combining the determined similarities to produce a neighborhood function that indicates a radial homogeneity of the attribute value; and comparing the transforms for pairs of points to determine their correspondence.

* * * * *